June 10, 1930. J. R. GEORGE 1,762,292
ROLLING MILL HOUSING AND BEARING CONSTRUCTION
Filed May 6, 1925 2 Sheets-Sheet 2

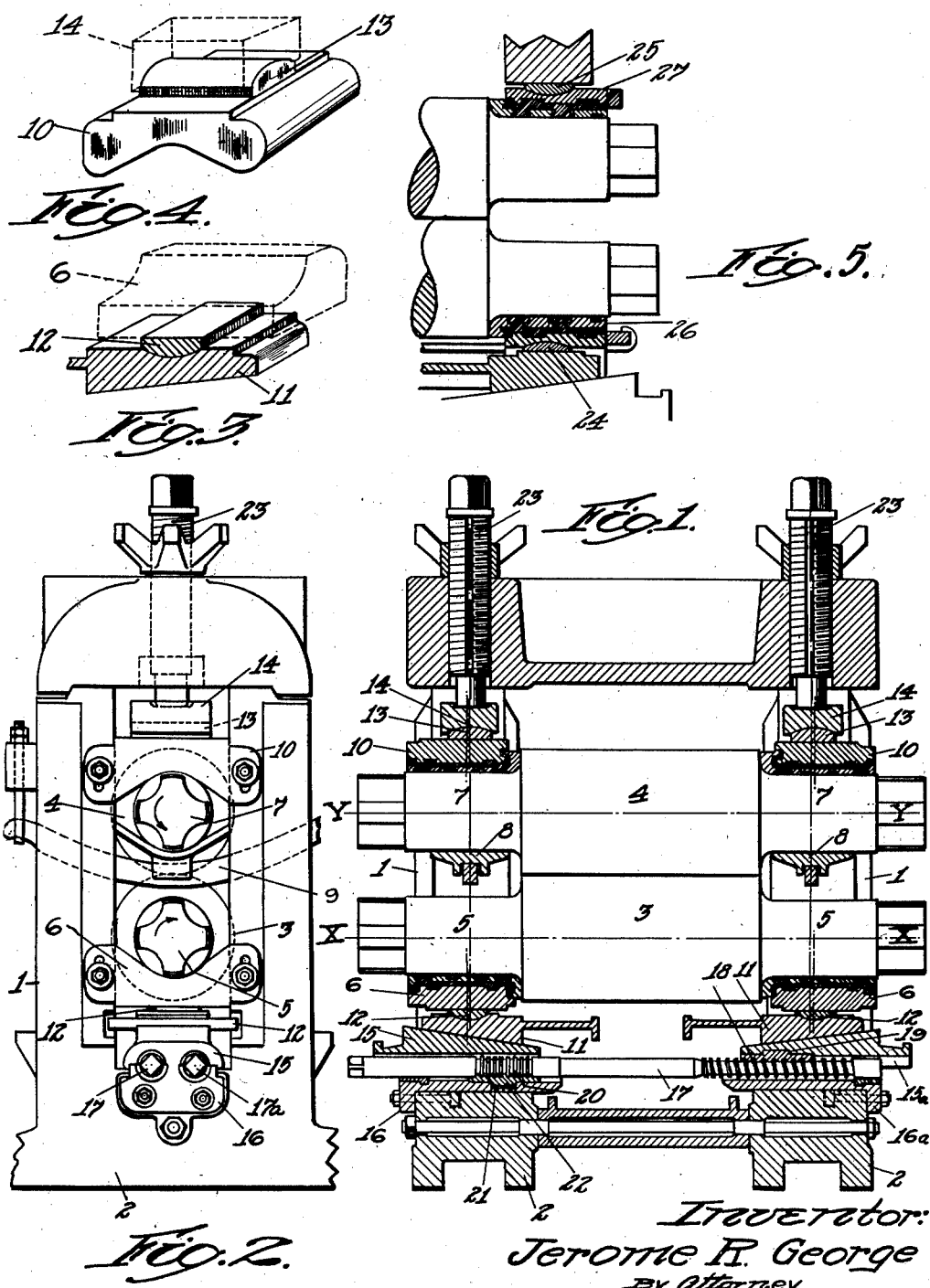

Inventor:
Jerome R. George
by attorney
Geo. W. Kennedy Jr.

Patented June 10, 1930

1,762,292

UNITED STATES PATENT OFFICE

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

ROLLING-MILL HOUSING AND BEARING CONSTRUCTION

Application filed May 6, 1925. Serial No. 28,383.

The present invention relates to rolling mills, and has particular reference to an improved construction of the bearings in which are journalled the necks or gudgeons of the cooperating mill rolls. The invention resides in the features of construction hereinafter more fully set forth, reference being had in this connection to the accompanying drawings wherein—

Fig. 1 is a vertical sectional view through a stand of rolls having journal bearings embodying the invention.

Fig. 2 is an end view of the parts shown in Fig. 1.

Figs. 3 and 4 are detached perspective views of the bearing mountings shown in Fig. 1.

Fig. 5 is a fragmentary vertical sectional view illustrating a modification of the invention.

Like reference characters refer to like parts in the different figures.

Figures 6, 8:
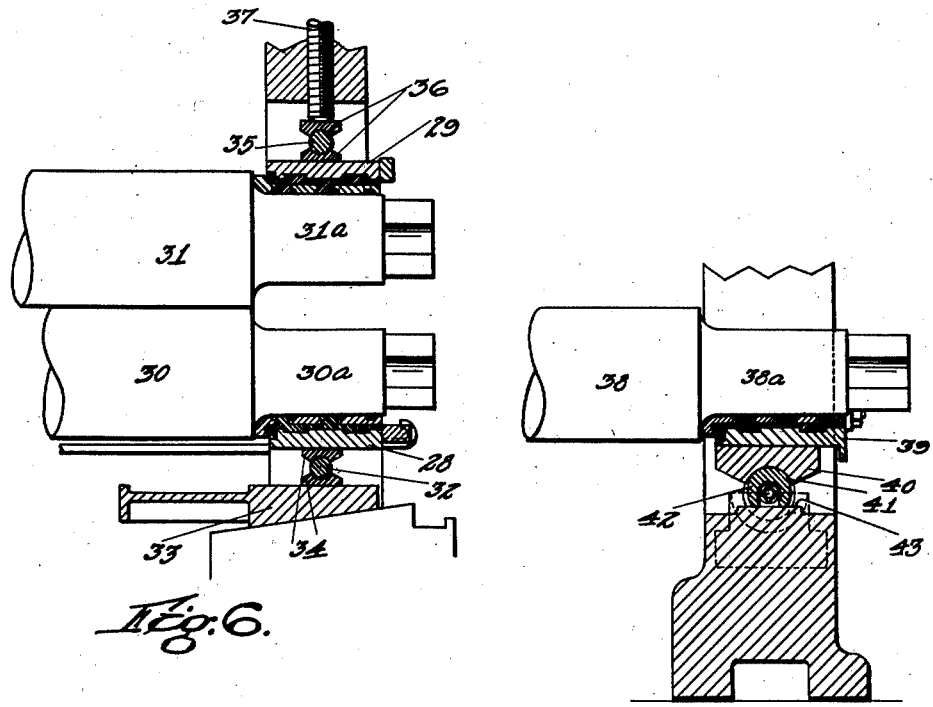
Fig. 6 is a view similar to Fig. 5, illustrating another modification of the invention.
Fig. 8 is a vertical sectional view on the line 8—8 of Fig. 7.

Referring first to Figs. 1 and 2, the invention is shown as applied to a roll housing, which consists, as usual, of opposite upright sides 1, 1, rising from a suitable base 2 and supporting between them, transversely, a lower roll 3 and an upper roll 4. The necks or gudgeons 5, 5 of lower roll 3 rest on suitable bottom bearings 6, 6 which, as hereinafter more fully described, are adjustably supported in the lower ends of vertical openings provided by the housing sides 1, 1. The necks or gudgeons 7, 7 of upper roll 4 find support in lower bearing blocks 8, 8, the latter being seated on a yoke 9 which is suitably supported on the outside of the housing in any desirable manner, as shown in Fig. 2.

Suitably associated with these lower bearings 8, 8 for the upper roll 4 are adjacent holding down bearings for the lower roll 3; the construction and adjustment of these upper bearings for the lower roll 3 form no part of the present invention and hence a description thereof is unnecessary; any desired construction may be employed, as for instance that disclosed by United States Letters Patent No. 1,544,572, dated July 7, 1925. The top bearings for the upper roll 4 are indicated at 10, 10, and these bearings, like the bottom bearings 6, 6 for the lower roll 3 are adjustably mounted in the vertical openings of the housing sides 1, 1; the present invention is concerned with the mounting and adjustment of these bearings 6, 6 and 10, 10.

In mills rolling either hot or cold metal, the rolls and the roll necks undergo very severe stresses, and it is therefore important to maintain as short a distance as possible between the bearing supports for said rolls. It is the practice therefore to make the roll necks and their bearings relatively short, and this results in high bearing pressures and correspondingly rapid wear of the bearing surfaces in contact with said necks. Furthermore, in hot rolling, the water used to flood the rolls carries particles of scale into the bearings, interfering with proper lubrication and still further increasing the wear. In addition to this, there are heavy end stresses set up on the rolls, due to the end thrust of the driving spindles and to the thrust of the metal in the roll grooves. Moreover, the passage of metal between the rolls is frequently under such excessive pressure as to cause their displacement or deflection from their normal axes X—X and Y—Y, respectively, as a result of which, in the ordinary mill construction, the bearings 6, 6 and 10, 10 which receive, respectively, the downward and upward thrusts of rolling, are worn unevenly, since by their failure to follow the said deflection of the roll axes, they maintain contact with the roll necks only at their inner or outer ends. The present invention overcomes the above mentioned difficulties in the following manner:—

As shown in Figs. 1 and 3, there is disposed below each lower bearing 6, 6 a pillow block 11, each pillow block providing on its upper surface a concave seat to receive the convex lower surface of a pivot block 12, which is interposed between each pillow block 11 and its associated bearing 6. Each pivot block 12, providing a flat upper surface for contact with the bearing 6, is of sufficient thickness to provide an appreciable clearance between the opposing faces of the bearing 6 and pillow block 11, this permitting a limited turning movement of the bearing 6 about an axis which is at right angles to the axis X—X, and which is the center of curvature of the bearing surface between each pillow block 11 and its associated pivot block 12. A similar construction is employed in connection with each upper bearing 10, 10, using interposed pivot blocks 13, 13, similar to the pivot blocks 12, 12, between said upper bearings 10, 10 and the pressure blocks 14, 14 which are ordinarily employed in rolling mill housings to hold the upper roll to its work. Said pressure blocks 14, 14 have concave lower surfaces to receive the convex surfaces of the pivot blocks 13, 13, the latter being of sufficient thickness to provide a clearance between the interposing faces of the bearings 10 and the pressure blocks 14, thus to permit limited turning movement of each bearing member 10 about an axis which is at right angles to the axis Y—Y, and which is the center of curvature of the contact surface between each pivot block 13 and its associated pressure block 14.

The constructions described above make the lower and upper bearings 6, 6 and 10, 10, respectively, self-alining, notwithstanding the fact that the roll axes X—X and Y—Y may, by the pressure of rolling, be deflected from their true horizontal positions. When such deflection occurs in either of the rolls 3 or 4, the displacement of the necks 5, 5 or 7, 7 of said rolls is accompanied by a simultaneous movement of the bearing members 6, 6 and 10, 10 associated with said necks, this movement being permitted by the ability of the pivot blocks 12, 12 and 13, 13 to shift angularly in their respective concave seats. As a consequence, each bearing member 6, 6 and 10, 10 maintains a contact throughout its entire length with its associated roll neck 5, 5 or 7, 7 as the case may be, and thus the bearing pressure in each instance is always distributed over the entire area of each such bearing, instead of being concentrated at a few points. This results in even and uniform wear of the bearings 6, 6 and 10, 10, and in the adjustments required from time to time to take up such wear, the present invention provides for the maintenance of the above described relations which insure even and uniform wear, as well as for compensating for any endwise play of the rolls, as will now be described.

As shown in Fig. 1, each pillow block 11, 11 has its under surface inclined for cooperation with the complementary surface of a longitudinally movable wedging member, the respective left and right hand wedging members being designated 15 and 15$^a$, and said wedging members being slidable in and out on fixed supporting members 16 and 16$^a$ secured to the housing sides 1, 1. The movement of wedging member 15$^a$ is secured by a shaft 17 having threaded engagement with a sleeve 18 that has a shoulder 19 seated in a recess of and connecting it with the wedging member 15$^a$. Said shaft 17 is held from longitudinal movement in any suitable manner, as by an interlocking tongue and groove engagement, as shown at 20, with a member 21 which has a shoulder 22 seated in a recess of and connecting it with the stationary supporting member 16. This permits the shaft 17 to be turned freely, thereby to screw the wedging member 15$^a$ inwardly or outwardly, as desired. A second shaft 17$^a$, Fig. 2, is employed for the movement of the other wedging member 15, the arrangement being the same as above described for the movement of wedging member 15$^a$, and the said shaft 17$^a$ having a screw thread connection, not shown, with the wedging member 15, and a tongue and groove engagement, not shown, with the stationary supporting member 16$^a$. When the two shafts 17 and 17$^a$ are rotated, to move the wedging members 15 and 15$^a$ towards each other, the pillow blocks 11, 11 are raised, this action taking up any wear in the bearings 6, 6. For cooperation with the pressure blocks 14, 14 associated with the upper bearings 10, 10, the housing provides the usual holding-down screws 23, 23, which are adjustable to take up wear in said bearings 10, 10 and to hold the upper roll 4 to its work.

As shown in Fig. 1, the axes of holding-down screws 23, 23 are slightly offset inwardly from the center lines of pivot blocks 12, 12 and 13, 13, this offset, when the bearings are new, being relatively small, namely about one-half the total distance allowed for longitudinal adjustment of the bearings 6, 6 and 10, 10 to take up end play. Longitudinal adjustment for this purpose, in the case of the lower roll bearings 6, 6 is effected simultaneously with the radial adjustment above described, that is to say, by the action of the wedges 15, 15$^a$. The drawing in of said wedges, as stated above, raises the pillow blocks 11, 11 for the radial adjustment, and this being accomplished, further drawing in of said wedges 15 and 15$^a$ will effect movement in unison therewith of the respective superposed pillow blocks and the bearings 6, 6 carried thereby, until the inner edges of said bearings 6, 6 bring up with sufficient snugness against the shoulders or ends of the roll 3. Any suitable means may be employed to thrust the upper roll bearings 10, 10 inwardly as end play of the upper roll develops, and in the case of both rolls, this longitudinal adjustment of the bearings to take up end play brings the center lines of the sets of pivot blocks 12, 12 and 13, 13 eventually into substantial alinement with the axes of the holding-down screws 23, 23; this distributes the pressure uniformly over the surfaces of the bearings 6, 6 and 10, 10 and maintains substantial alinement of the upward and downward radial pressures on the necks 5, 5 and 7, 7.

In the modification of the invention shown in Fig. 5, the construction is substantially the same, except that the concave seats for the lower and upper pivot blocks 24, 24 and 25, 25, respectively are provided in the bearing members 26, 26 and 27, 27 instead of in the associated pillow blocks and pressure blocks. Said bearing members 26, 26 and 27, 27 are capable, in exactly the same way as the bearing members 6, 6 and 10, 10, of automatically alining themselves on their respective roll necks, and are also adjustable, in the same way as the bearings 6, 6 and 10, 10, to take up wear, both radially and longitudinally.

Referring now to Fig. 6, there is shown a still further modification in the manner of supporting the lower and upper bearings 28 and 29 so as to be self-alining with respect to the neck portions 30$^a$ and 31$^a$, respectively, of the rolls 30 and 31. In this arrangement the lower bearing 28 is supported for pivotal movement about the axis of a cylindrical member 32 interposed between the bearing 28 and its pillow block 33, suitable shoes 34, 34 being provided above and below the cylindrical member 32. A similar cylindrical member 35 with cooperating shoes 36, 36 is provided between the upper bearing 29 and a holding-down screw 37, whereby the upper roll 31 is capable of pivotal movement about the axis of the cylindrical member 35.

Figure 7:
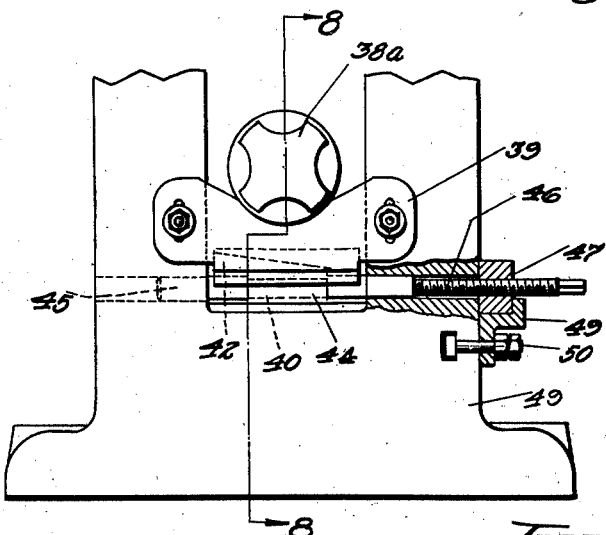
Fig. 7 is a view in end elevation showing a further modification of the invention.

Referring now to Figs. 7 and 8, there is shown a still further modification in the manner of supporting a roll neck bearing for pivotal movement, and for effecting adjustment of the same to take up wear. In this arrangement only the lower roll 38 of a stand of rolls is shown, the neck portion 38$^a$ of said roll being supported in a bearing 39 of the same general type as the bearings 6, 6 of Fig. 1. The lower plane surface of the bearing 39 rests on the upper plane surface of a block 40 which is provided on its underside with a concave seat 41 of tapering form, as shown in Fig. 8. A sleeve-like member 42, having an external taper complementary to that of the seat 41, is interposed between block 40 and the stationary flat supporting surface 43 of the roll housing, along which surface the member 42 is adapted to slide longitudinally. To this end said member 42 is made to embrace a reduced portion 44 of a shaft 45, the latter being free to turn in said member, but said member being constrained to move longitudinally with said shaft. The end portion of the shaft 45 is threaded at 46 into a nut 47 which is held stationary against the housing frame 48 by a clamp 49 and bolt 50.

Turning of the shaft 45 within the nut 47 moves the shaft 45 longitudinally, and such movement of the shaft 45 carries the member 42 with it. When the shaft 45 is turned to draw it out of the nut 47, the resulting movement of the sleeve 42 to the right in Fig. 8, causes the block 40 to be raised by reason of the cooperation between the tapered surface of the seat 41 and the member 42, thus taking up wear in the bearing 39. It is obvious that the bearing 39 is capable of pivotal movement on the cylindrical contact surface between members 40 and 42, so that said bearing is adapted to automatically aline itself with the roll neck 38$^a$, in precisely the same manner as the bearings 6, 6 and 10, 10 of Fig. 1.

From the foregoing, it is apparent that the invention provides a self-alining adjustable roll neck bearing that is particularly adapted to meet the conditions encountered in rolling mill operation which have heretofore resulted in uneven wear of the bearings. With the improved bearing mountings herein shown it is obvious that any deflection of a roll from its normal axis is accompanied by a simultaneous movement of the associated bearing about the pivotal axis provided by its mounting so that the contact surface of the bearing is always maintained normal to the roll neck. Furthermore, the fact that the pivotal axis of a bearing is always located substantially in line with the center of the roll neck, insures equal distribution of bearing pressures and consequent even wear of the bearing. Furthermore, the invention provides means whereby the bearings may be taken up to compensate for wear without affecting the self-alining capabilities thereof.

I claim:

In a rolling mill housing, a supporting bearing for the lower roll neck, a holding-down bearing for the upper roll neck, a holding-down screw for said last named bearing, and means permitting shifting of both of said bearings about axes at right angles to the axes of their respective necks, said pivotal axes of said bearings being offset, when the bearings are new, from the center line of said holding-down screw, whereby longitudinal adjustment to take up endwise play in said bearings brings said axes substantially in line with the pressure exerted by said screw.

Dated this first day of May, 1925.

JEROME R. GEORGE.